United States Patent
Maciesowicz et al.

(10) Patent No.: US 8,847,998 B2
(45) Date of Patent: Sep. 30, 2014

(54) INTERRUPT-BASED NOTIFICATIONS FOR DISPLAY SETTING CHANGES

(75) Inventors: Maciej Maciesowicz, Gilroy, CA (US); Jack I. Fu, San Mateo, CA (US); David Lum, Cupertino, CA (US)

(73) Assignee: APPLE Inc., Cupertino, CA (US)

(*) Notice: Subject to any disclaimer, the term of this patent is extended or adjusted under 35 U.S.C. 154(b) by 971 days.

(21) Appl. No.: 12/897,407

(22) Filed: Oct. 4, 2010

(65) Prior Publication Data

US 2012/0026202 A1 Feb. 2, 2012

Related U.S. Application Data

(60) Provisional application No. 61/368,164, filed on Jul. 27, 2010.

(51) Int. Cl.
*G09G 5/10* (2006.01)
*G09G 3/36* (2006.01)
*G06F 3/038* (2013.01)
*G06F 3/00* (2006.01)
*G06F 13/14* (2006.01)
*G09G 5/02* (2006.01)
*G06F 3/14* (2006.01)

(52) U.S. Cl.
CPC ............ *G06F 3/14* (2013.01); *G09G 2360/144* (2013.01); *G09G 2320/0626* (2013.01)
USPC ........... 345/690; 345/102; 345/205; 345/214; 345/520; 345/204; 345/699; 715/700

(58) Field of Classification Search
CPC ......... G09G 5/00; G09G 5/003; G09G 5/006; G09G 5/10; G09G 3/28; G09G 3/36; G06F 3/038
USPC ............... 345/55, 63, 84, 102, 204–205, 207, 345/690, 520, 699; 715/700
See application file for complete search history.

(56) References Cited

U.S. PATENT DOCUMENTS

| | | | | | |
|---|---|---|---|---|---|
| 6,094,185 | A | * | 7/2000 | Shirriff | 345/102 |
| 7,456,829 | B2 | * | 11/2008 | Fry | 345/204 |
| 8,279,138 | B1 | * | 10/2012 | Margulis | 345/1.1 |
| 2007/0046697 | A1 | * | 3/2007 | Hussain | 345/649 |

* cited by examiner

*Primary Examiner* — Lun-Yi Lao
*Assistant Examiner* — Jarurat Suteerawongsa
(74) *Attorney, Agent, or Firm* — Fletcher Yoder PC (57) ABSTRACT

The disclosed embodiments relate to a system that communicates a change in a display setting from a display to a host system for the display. During operation, the system determines at the display that the display setting has changed. Next, in response to the change, the system sends an interrupt from the display to the host system through a first interface, wherein the interrupt informs the host system that the display setting has changed. After sending the interrupt to the host system, the system receives a request from the host system to obtain values for one or more display settings including the changed display setting. In response to the request, the system sends updated values for the one or more display settings to the host system.

20 Claims, 6 Drawing Sheets

FIG. 5A though a display-control abstraction in accordance with the disclosed embodiments.
INTERRUPT-BASED NOTIFICATIONS FOR DISPLAY SETTING CHANGES

RELATED APPLICATION

This application claims priority under 35 U.S.C. §119 to U.S. Provisional Patent Application No. 61/368,164 filed Jul. 27, 2010, entitled "Using a Display Abstraction to Control a Display" by Maciej Maciesowicz and David A. Curran.

BACKGROUND

1. Field

The disclosed embodiments generally relate to techniques for controlling displays in computer systems. More specifically, the disclosed embodiments relate to a system that provides interrupt-based notifications for display setting changes.

2. Related Art

A computing display typically has a number of display settings, such as display brightness, display hue and audio volume, which can be changed by a host system. However, these display settings can also be changed in other ways. For example, in some displays that include an ambient light sensor, a display controller can change a brightness setting for the display in response to changes in ambient light. Other displays may provide multiple interfaces which are controlled by different software stacks. In this case, software which communicates with a display through a first interface may not be aware of changes to display settings which are triggered by communications to the display through a second interface. Such changes in display settings can be detected if the system continually polls the display to obtain the display settings. However, this polling process consumes power and can adversely affect system performance. Hence, what is needed is a technique for obtaining changes in display settings at a host system without the disadvantages of continually polling to detect such changes.

SUMMARY

The disclosed embodiments relate to a system that communicates a change in a display setting from a display to a host system for the display. During operation, the system determines at the display that the display setting has changed. Next, in response to the change, the system sends an interrupt from the display to the host system through a first interface, wherein the interrupt informs the host system that the display setting has changed.

In some embodiments, after sending the interrupt to the host system, the system receives a request from the host system to obtain values for one or more display settings including the changed display setting. In response to the request, the system sends updated values for the one or more display settings to the host system.

In some embodiments, if the change in the display setting is triggered by a communication from the host system through the first interface, the interrupt is suppressed and is not sent to the host system. On the other hand, if the change in the display setting is triggered by a communication from the host system through a second interface which is different from the first interface, the interrupt is not suppressed and is sent to the host system.

In some embodiments, the display setting specifies a value for one or more of the following: a display brightness; a display contrast; a display hue; a display saturation; an audio volume for an audio-output device associated with the display; and an audio balance between channels for the audio-output device.

In some embodiments, the display setting specifies a brightness for the display. In these embodiments, prior to determining that the display setting has changed, the system changes the display setting by: detecting a change in ambient light through an ambient light sensor in the display; and in response to the change in ambient light, changing the display setting to adjust the brightness of the display.

In some embodiments, in response to the interrupt, the host system: determines an updated value for the display setting; and uses the updated value to perform a display-related operation at the host system.

In some embodiments, determining the updated value for the display setting includes: sending a request to the display, wherein the request asks for values of one or more display settings including the changed display setting. In response to the request, the host system receives updated values for the one or more display settings at the host system.

In some embodiments, using the updated value to perform the display-related operation includes using the updated value to update a user interface associated with the display, so that the user interface is consistent with the updated value of the display setting.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1:
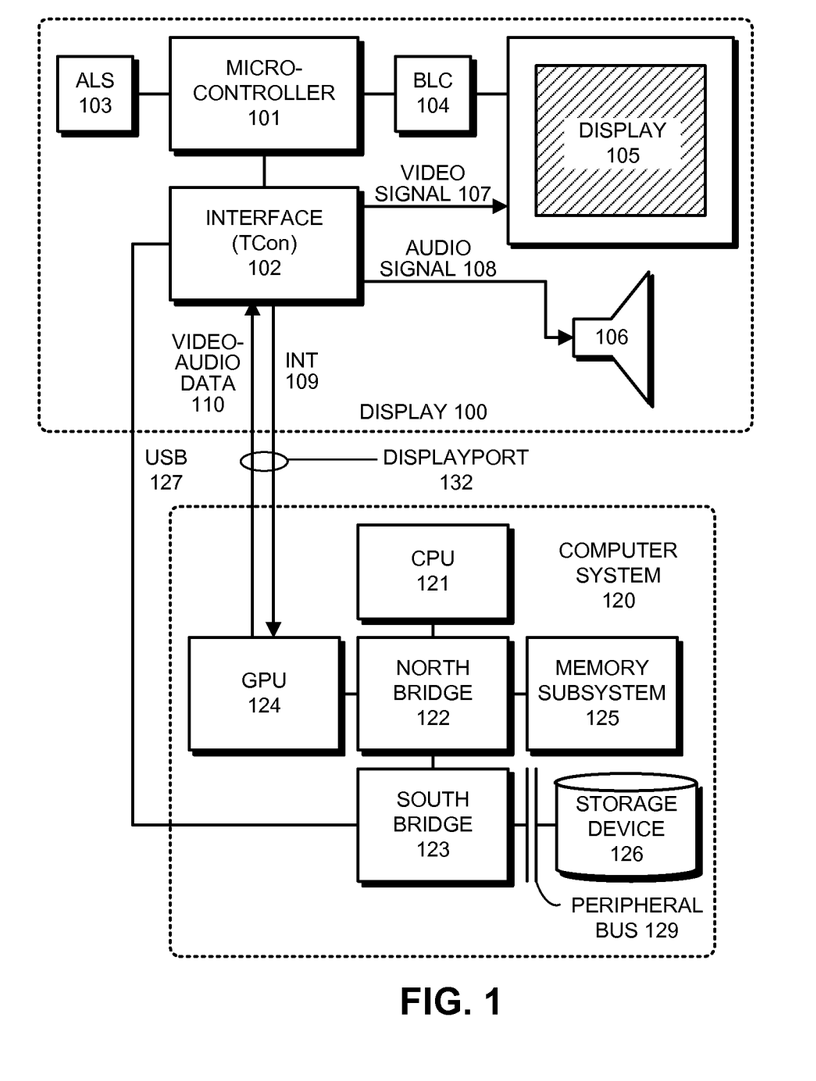
FIG. 1 illustrates a computer system and a display in accordance with the disclosed embodiments.

FIG. 1 illustrates a computer system 120 and an associated display 100 in accordance with the disclosed embodiments. Computer system 120 can generally include any type of computer system or computational device, including, but not limited to, a computer system based on a microprocessor, a mainframe computer, a digital signal processor, a portable computing device, a personal organizer, a cell phone, a device controller, or a computational engine within an appliance. As illustrated in FIG. 1, computer system 120 includes a central-processing unit (CPU) 121, which can be coupled to one or more bridge chips, including north bridge 122 and south bridge 123. CPU 121 communicates with a memory subsystem 125 through north bridge 122, wherein memory subsystem 125 contains random-access memory, which can be organized as one or more levels of cache memory and a main memory. CPU 121 can also communicate with a storage device 126 through a peripheral bus 129, which is coupled to south bridge 123. Storage device 126 can include any type of non-volatile storage device that can be coupled to a computer system. This includes, but is not limited to, magnetic, optical, or magneto-optical storage devices, as well as storage devices based on flash memory and/or battery-backed up memory. CPU 121 can additionally communicate with the graphics-processing unit (GPU) 124 through north bridge 122. GPU 124 contains specialized components for processing graphics data, including a dedicated graphics processor and possibly a dedicated graphics memory.

As illustrated in FIG. 1, computer system 120 can communicate with display 100 through either a Universal Serial Bus (USB) interface 127, which is coupled to south bridge 123, or a DisplayPort interface, which is coupled to GPU 124.

Display 100 can generally include any type of output device for outputting visual (and possibly audio) information for a computer system. Display 100 can be an external display, which can be selectively attached to computer system 120 through an interface, or alternatively an internal display, which is integrated into computer system 120. Display 100 includes an interface circuit 102, which is coupled to computer system 120 through both a display port interface 132 and a USB interface 127. Interface circuit 102 directs a video signal 107 containing video data to display 105, and additionally directs an audio signal 108 containing audio data to audio output device (speaker) 106. Interface circuit 102 also communicates with a micro-controller 101, which communicates with and controls various components within display 100. More specifically, micro-controller 101 receives signals from an Ambient Light Sensor (ALS) 103, which is integrated into the display. Micro-controller 101 can also communicate with a Back-Light Controller (BLC) 104, which controls the intensity of a backlight for display 105. Note that micro-controller 101 can adjust the intensity of the backlighting for display 105 based on an ambient light level measured through ALS 103. This control process, along with other operations performed by the various components within display 100, are described in more detail below.

Software Architecture

Figure 2:
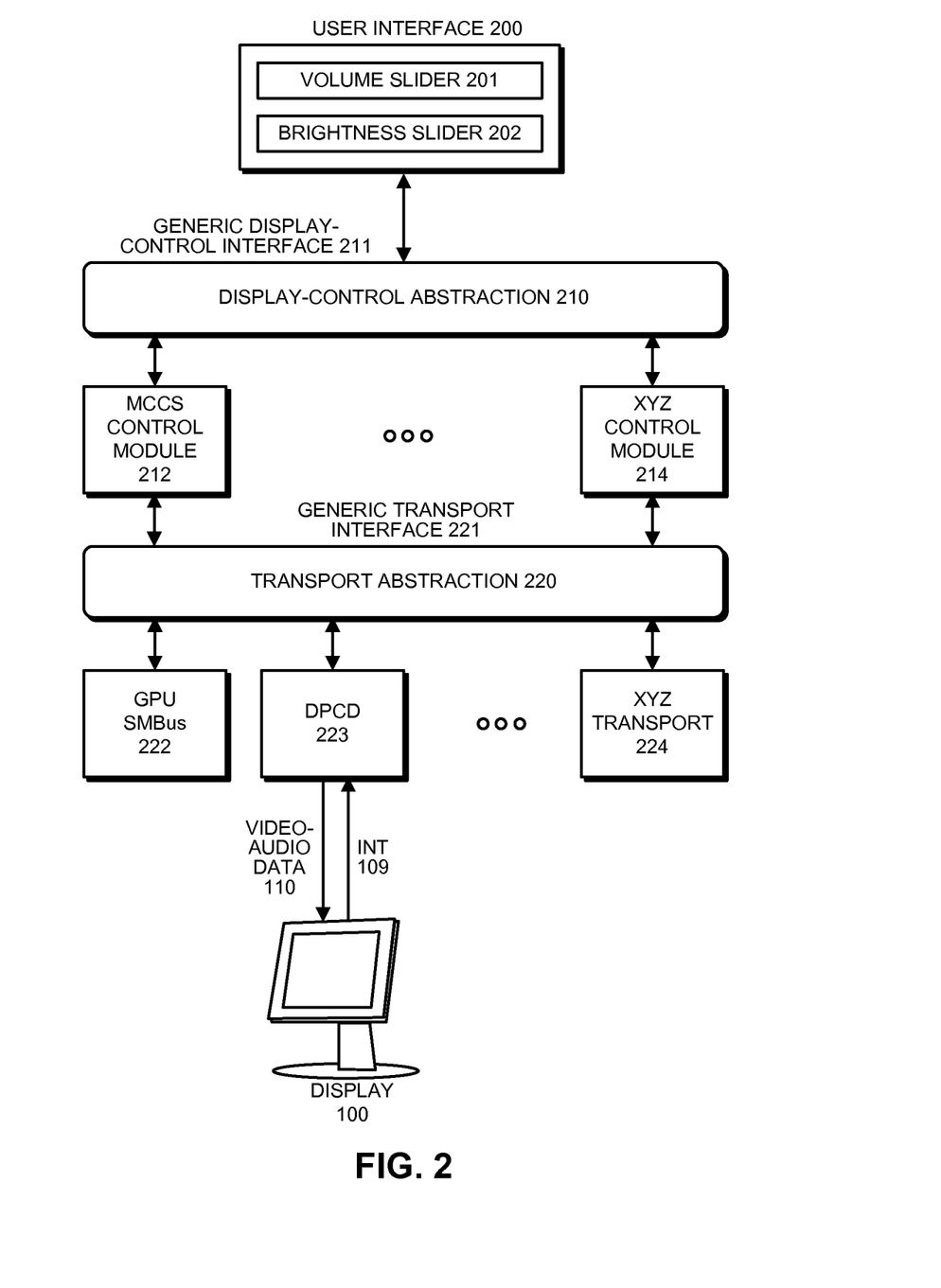
FIG. 2 illustrates a software architecture that facilitates controlling a display in accordance with the disclosed embodiments.

FIG. 2 illustrates a software architecture that facilitates controlling a display in accordance with the disclosed embodiments. This software architecture includes a display-control abstraction 210 which exposes a generic display-control interface 211 to client code. Note that this client code can include any application code or system code that makes calls (or invocations) to control the display. More specifically, FIG. 2 illustrates a user interface 200, which provides controls that can be used to control various settings for a display, including a volume slider 201 and a brightness slider 202. When a user manipulates these sliders, calls (invocations) are made through generic display-control interface 211 to communicate associated changes in volume and brightness to display-control abstraction 210. Display-control abstraction 210 translates these calls (invocations) into calls (invocations) to a pluggable display-control module, such as MCCS control module 212 or XYZ control module 214, which are illustrated in FIG. 2. These pluggable display-control modules fit into a plug-in framework associated with display-control abstraction 210. This enables different control modules to be swapped in without having to modify the client code.

The pluggable display-control modules can communicate with display 100 by making calls (invocations) through a transport abstraction 220 that exposes a generic transport interface 221. Transport abstraction 220 translates calls to generic display-control interface 211 into calls to a pluggable transport module, such as a GPU SMBus module 222, a DisplayPort Configuration Data (DPCD) protocol module 223, or XYZ transport module 224 as is illustrated in FIG. 2. These pluggable transport modules fit into a plug-in framework associated with transport abstraction 220. This enables different transport modules to be swapped in without having to modify calls from the display-control modules. Note that FIG. 2 illustrates how DPCD module 223 can be used to send video and audio data 110 to display 100, and to receive interrupts 109 from display 100. Also note that some of these interrupts 109 can indicate that display settings have changed within display 100.

Display and Transport Abstractions

Figure 3A:
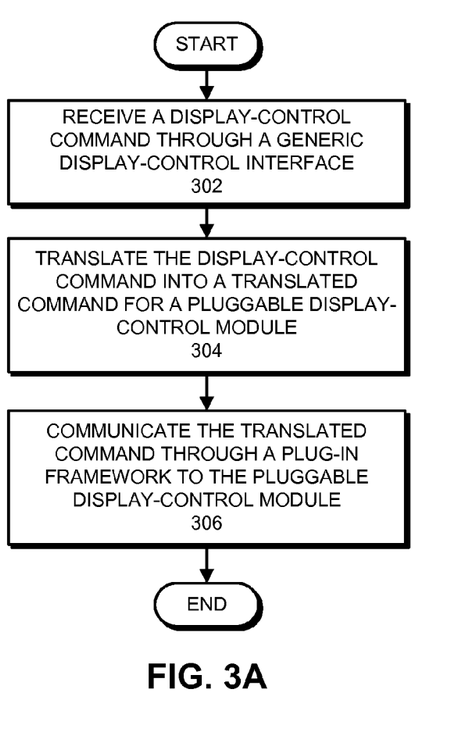
FIG. 3A presents a flow chart illustrating how a command is communicated to a pluggable display-control module though a display-control abstraction in accordance with the disclosed embodiments.

FIG. 3A presents a flow chart illustrating how a command is communicated to a pluggable display-control module though a display-control abstraction that exposes a generic display-control interface in accordance with the disclosed embodiments. Note that the display-control abstraction can be implemented using a display object, which resides in a system registry.

During operation, the system first receives a command to control the display through a generic display-control interface (step 302). Next, the system translates the command into a corresponding translated command for a pluggable display-control module including code that implements a standardized set of display-control commands (step 304). Finally, the system communicates the translated command through a plug-in framework to the pluggable display-control module (step 306), wherein the plug-in framework houses the pluggable display-control module and enables the generic display-control interface to communicate with the pluggable display-control module.

Figure 3B:
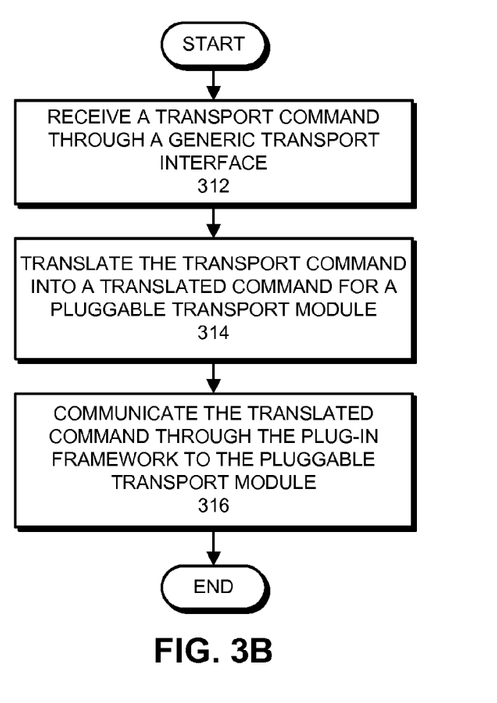
FIG. 3B presents a flow chart illustrating how a command is communicated to a pluggable transport module through a transport abstraction in accordance with the disclosed embodiments.

FIG. 3B presents a flow chart illustrating how a command is communicated to a pluggable transport module through a transport abstraction that exposes a generic transport interface in accordance with the disclosed embodiments. Note that the transport abstraction can be similarly implemented using a transport object, which resides in a system registry. During operation, the system first receives a command from a pluggable display-control module through a generic transport interface which facilitates communicating with the display (step 312). Next, the system translates the command into a corresponding translated command for a pluggable transport module including code that implements a standardized transport protocol (step 314). Finally, the system communicates the translated command through the plug-in framework to the pluggable transport module (step 316), wherein the plug-in framework houses the pluggable transport module and enables the pluggable display-control module to communicate with the pluggable transport module.

Figure 3C:
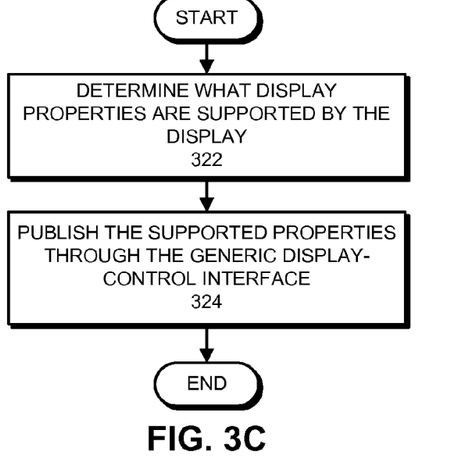
FIG. 3C presents a flow chart illustrating how display properties are published in accordance with the disclosed embodiments.

FIG. 3C presents a flow chart illustrating how display properties are published in accordance with the disclosed embodiments. First, the system determines what display properties are supported by the display (step 322). For example, the display may support: a display brightness; a display contrast; a display hue; a display saturation; an audio volume for an audio-output device associated with the display; and an audio balance between channels for the audio-output device. Next, the system publishes the supported display properties through the generic display-control interface (step 324). The generic display-control interface can, for example, represent the brightness for a display generically by specifying (1) a minimum value for brightness, (2) a maximum value for brightness, and (3) a current value for brightness.

Display-Setting-Change Interrupt

Figure 4A:
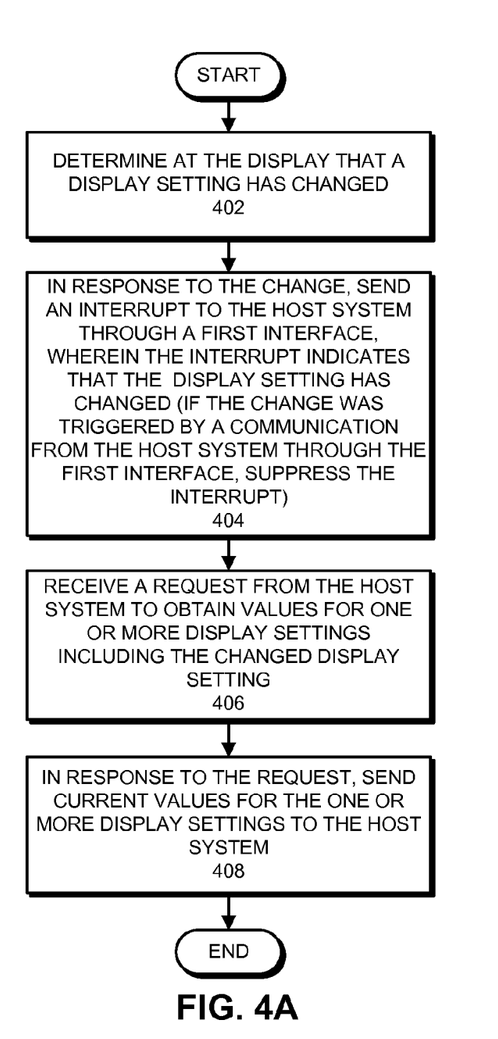
FIG. 4A presents a flow chart illustrating how a display-setting interrupt is generated in accordance with the disclosed embodiments.

FIG. 4A presents a flow chart illustrating how a display-setting-change interrupt is generated in accordance with the disclosed embodiments. Note that some displays presently use interrupts for system-related purposes. For example, interrupts can be generated to notify the system that there is an authentication failure associated with High-bandwidth Digital Content Protection (HDCP) copy protection, or to notify the system that checksum errors are occurring because the display is receiving corrupted data packets. However, displays presently do not generate interrupts to indicate that a display setting has changed. The only thing that can be done in existing systems to keep track of display settings is to perform polling operations. For example, this can involve polling brightness buttons on a display to determine whether a user has pushed a brightness button to increase or decrease the brightness of the display. However, as mentioned above, this polling-based approach consumes power and can adversely affect system performance.

Referring back the flowchart in FIG. 4A, the system first determines at the display that the display setting has changed (step 402). For example, the brightness of the display can change in response to a change in ambient light detected by an ambient light sensor in the display. (This process is described in more detail below with reference to FIG. 4B.) Next, in response to the change, the system can send an interrupt from the display to the host system through a first interface, wherein the interrupt informs the host system that the display setting has changed (step 404). (Note that if the change in the display setting is triggered by a communication from the host system through the first interface, the interrupt is suppressed and is not sent to the host system. On the other hand, if the change in the display setting is triggered by a communication from the host system through a second interface which is different from the first interface, the interrupt is not suppressed and is sent to the host system.)

After sending the interrupt to the host system, the system receives a request from the host system to obtain values for one or more display settings including the changed display setting (step 406). In response to this request, the system sends updated values for the one or more display settings to the host system (step 408).

Figure 4B:
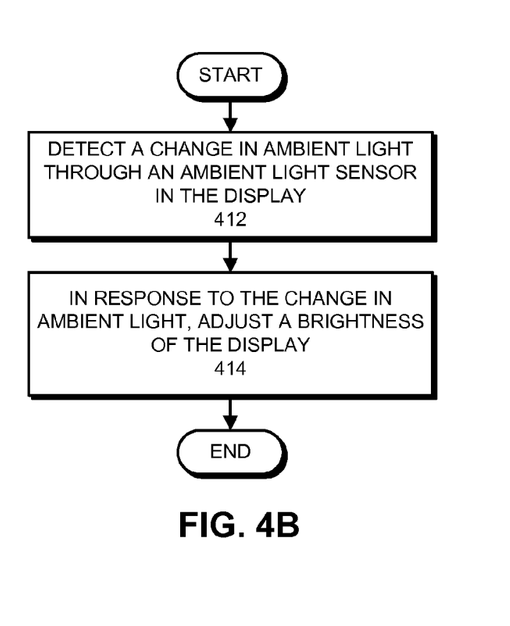
FIG. 4B presents a flow chart illustrating how a change in ambient lighting triggers a change in the brightness of a display in accordance with the disclosed embodiments.

FIG. 4B presents a flow chart illustrating how a change in ambient lighting triggers a change in the brightness of a display in accordance with the disclosed embodiments. First, the system detects a change in ambient light through an ambient light sensor in the display (step 412). Next, in response to the change in ambient light, the system adjusts the brightness of the display (step 414). For example, if the ambient light decreases, the brightness of the display can be decreased to conserve power without adversely affecting the ability of a user to view the display. On the other hand, if the ambient light increases, the brightness of the display can be increased to enable the user to see the images on the display in the presence of the increased ambient light.

Figure 4C:
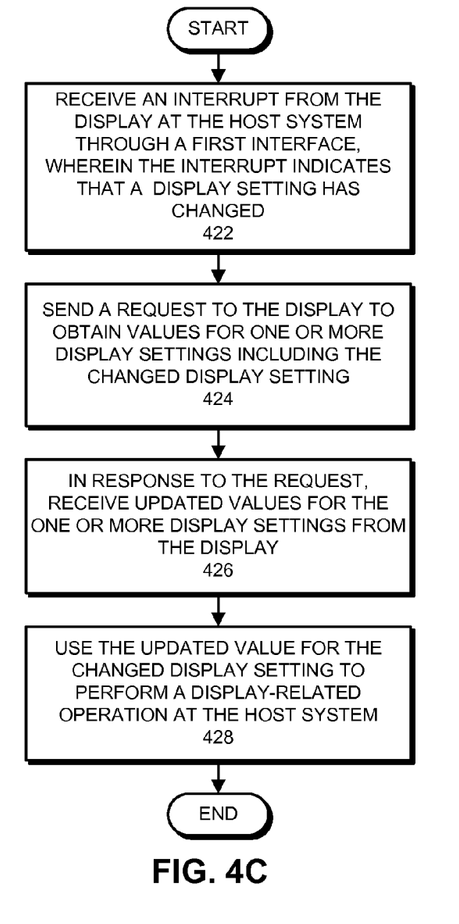
FIG. 4C presents a flow chart illustrating how a display-setting interrupt is processed at a host system in accordance with the disclosed embodiments.

FIG. 4C presents a flow chart illustrating how a display-setting interrupt is processed at a host in accordance with the disclosed embodiments. First, the host system receives an interrupt from the display through a first interface, wherein the interrupt indicates that a display setting has changed (step 422). Next, in response to the interrupt, the host system sends a request to the display, wherein the request asks for values of one or more display settings including the changed display setting (step 424). In response to the request, the host system receives updated values for the one or more display settings from the display (step 426). Finally, the host system uses the updated value for the changed display setting to perform a display-related operation at the host system (step 428). For example, the host system can use the updated value to update a user interface associated with the display, so that the user interface is consistent with the updated value of the display setting. More specifically, if the brightness of the display has changed, the host system can use the updated brightness value to update a setting for a brightness slider in a user interface that is used to control settings for the display.

Video-Blank Mode

Figure 5A:
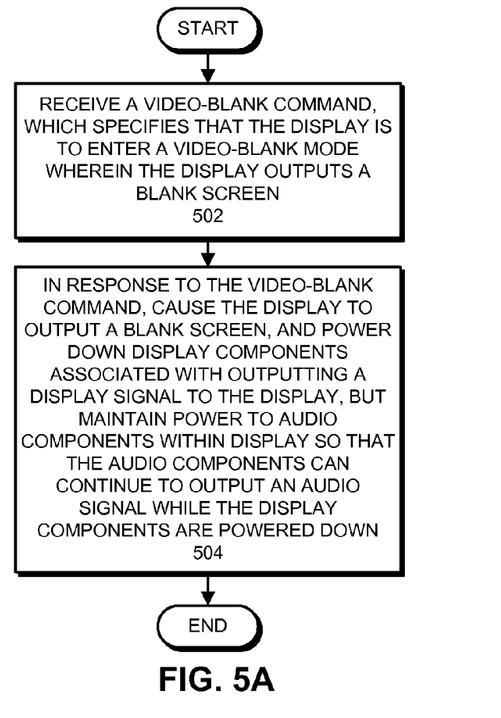
FIG. 5A presents a flow chart illustrating how the display powers down display-related components during a video-blank mode in accordance with the disclosed embodiments.

FIG. 5A presents a flow chart illustrating how the display powers down display-related components during a video-blank mode in accordance with the disclosed embodiments. First, the system receives a video-blank command, which specifies that the display is to enter a video-blank mode wherein the display outputs a blank screen (step 502). Next, in response to the video-blank command, the system causes the display to output a blank screen, and powers down display components associated with outputting a display signal to the display. At the same time, the system maintains power to audio components within the display, so that the audio components can continue to output an audio signal while the display components are powered down (step 504).

Figure 5B:
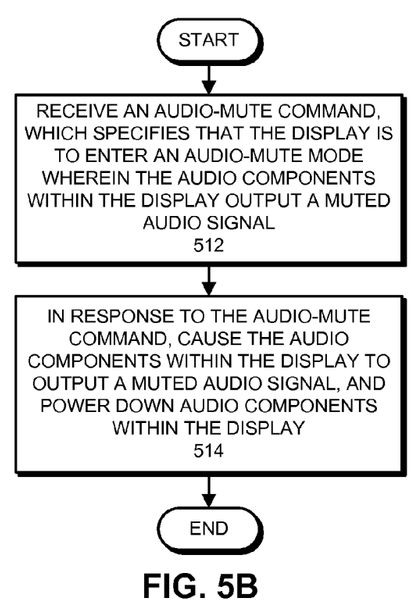
FIG. 5B presents a flow chart illustrating how the display powers down audio-related components during an audio-mute mode in accordance with the disclosed embodiments.

FIG. 5B presents a flow chart illustrating how the display powers down audio-related components during an audio-mute mode in accordance with the disclosed embodiments. First, the system receives an audio-mute command, which specifies that the display is to enter an audio-mute mode wherein the audio components output a muted audio signal (step 512). Next, in response to the audio-mute command, the system (1) causes the audio components to output the muted audio signal, and (2) powers down the audio components (step 514). In some cases, the display components can remain powered up to continue outputting a video signal while the audio components are powered down.

Figure 5C:
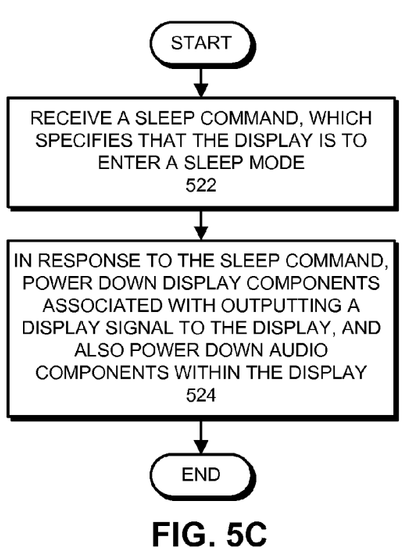
FIG. 5C presents a flow chart illustrating how the display powers down display-related and audio-related components during a sleep mode in accordance with the disclosed embodiments.

FIG. 5C presents a flow chart illustrating how the display powers down display-related and audio-related components during a sleep mode in accordance with the disclosed embodiments. First, the system receives a sleep command, which specifies that the display is to enter a sleep mode wherein components in the display are powered down (step 522). Next, in response to the sleep command, the system powers down both display-related components and audio-related components within the display (step 524).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for communicating a change in a display setting from a display to a host system for the display, the method comprising: determining, at the display, that the display setting has changed; and only in response to the change, sending an interrupt from the display to the host system through a first interface, wherein the interrupt informs the host system that the display setting has changed; wherein if the change in the display setting is triggered by a communication from the host system through the first interface, the interrupt is suppressed and is not sent to the host system; and wherein if the change in the display setting is triggered by a communication from the host system through a second interface which is different from the first interface, the interrupt is not suppressed and is sent to the host system.

2. The method of claim 1, wherein after sending the interrupt to the host system, the method further comprises:
receiving a request from the host system to obtain values for one or more display settings including the changed display setting; and
in response to the request, sending updated values for the one or more display settings to the host system.

3. The method of claim 1, wherein the first interface is a DisplayPort interface; and wherein the second interface is a Universal Serial Bus (USB) interface.

4. The method of claim 1,
wherein the display setting specifies a brightness for the display; and
wherein prior to determining that the display setting has changed, the method further comprises changing the display setting by,
detecting a change in ambient light through an ambient light sensor in the display, and
in response to the change in ambient light, changing the display setting to adjust the brightness of the display.

5. The method of claim 1, wherein the display setting specifies a value for one or more of the following:
a display brightness;
a display contrast;
a display hue;
a display saturation;
an audio volume for an audio-output device associated with the display; and
an audio balance between channels for the audio-output device.

6. A method for communicating a change in a display setting from a display to a host system for the display, the method comprising: receiving an interrupt from the display at the host system through a first interface, wherein the interrupt is sent only in response to a change in a display setting and informs the host system that a display setting has changed; and in response to the interrupt, determining an updated value for the display setting, and using the updated value to perform a display-related operation at the host system; wherein if the change in the display setting is triggered by a communication from the host system through the first interface, the interrupt is suppressed and is not sent to the host system; and wherein if the change in the display setting is triggered by a communication from the host system through a second interface which is different from the first interface, the interrupt is not suppressed and is sent to the host system.

7. The method of claim 6, wherein determining the updated value for the display setting includes:
sending a request to the display, wherein the request asks for values of one or more display settings including the changed display setting;
and in response to the request, receiving updated values for the one or more display settings at the host system.

8. The method of claim 6, wherein using the updated value to perform the display-related operation includes using the updated value to update a user interface associated with the display, so that the user interface is consistent with the updated value of the display setting.

9. The method of claim 6, wherein the display setting specifies a value for one or more of the following:
a display brightness;
a display contrast;
a display hue;
a display saturation;
an audio volume for an audio-output device associated with the display; and
an audio balance between channels for the audio-output device.

10. The method of claim 6, wherein the first interface is a DisplayPort interface.

11. A display system that communicates a change in a display setting to a host system for a display, the display system comprising: the display; and a display controller coupled to the display and in communication with the host system; wherein the display controller is configured to, determine that the display setting has changed; and only in response to the change, send an interrupt from the display to the host system through a first interface, wherein the interrupt informs the host system that the display setting has changed; wherein if the change in the display setting is triggered by a communication from the host system through the first interface, the display controller is configured to suppress the interrupt so that the interrupt is not sent to the host system; and wherein if the change in the display setting is triggered by a communication from the host system through a second interface which is different from the first interface, the display controller is configured to not suppress the interrupt, so that the interrupt is sent to the host system.

12. The display system of claim 11, wherein after sending the interrupt to the host system, the display controller is configured to:
   receive a request from the host system to obtain values for one or more display settings including the changed display setting; and
   in response to the request, send updated values for the one or more display settings to the host system.

13. The display system of claim 11, wherein the first interface is a DisplayPort interface; and wherein the second interface is a Universal Serial Bus (USB) interface.

14. The display system of claim 11,
   wherein the display setting specifies a brightness for the display; and
   wherein prior to determining that the display setting has changed, the display controller is configured to change the display setting by:
      detecting a change in ambient light through an ambient light sensor in the display, and
      in response to the change in ambient light, changing the display setting to adjust the brightness of the display.

15. The display system of claim 11, wherein the display setting specifies a value for one or more of the following:
   a display brightness;
   a display contrast;
   a display hue;
   a display saturation;
   an audio volume for an audio-output device associated with the display; and
   an audio balance between channels for the audio-output device.

16. A computer system configured to receive a change in a display setting from a display, the computer system comprising: a processor; a memory; and a first interface which couples the computer system to the display; wherein the computer system is configured to, receive an interrupt from the display through the first interface, wherein the interrupt is sent only in response to a change in a display setting and informs the host system that a display setting has changed, and in response to the interrupt, determine an updated value for the display setting, and use the updated value to perform a display-related operation at the host system; wherein if the change in the display setting is triggered by a communication from the host system through the first interface, the display controller is configured to suppress the interrupt so that the interrupt is not sent to the host system; and wherein if the change in the display setting is triggered by a communication from the host system through a second interface which is different from the first interface, the display controller is configured to not suppress the interrupt, so that the interrupt is sent to the host system.

17. The computer system of claim 16, wherein while determining the updated value for the display setting, the computer system is configured to:
   send a request to the display, wherein the request asks for values of one or more display settings including the changed display setting; and
   in response to the request, receive updated values for the one or more display settings at the host system.

18. The computer system of claim 16, wherein while using the updated value to perform the display-related operation, the computer system is configured to use the updated value to update a user interface associated with the display, so that the user interface is consistent with the updated value of the display setting.

19. The computer system of claim 16, wherein the display setting specifies a value for one or more of the following:
   a display brightness;
   a display contrast;
   a display hue;
   a display saturation;
   an audio volume for an audio-output device associated with the display; and
   an audio balance between channels for the audio-output device.

20. The computer system of claim 16, wherein the first interface is a DisplayPort interface.

* * * * *